United States Patent
Lou et al.

(10) Patent No.: US 8,300,430 B2
(45) Date of Patent: Oct. 30, 2012

(54) COMPENSATION DEVICE FOR SYNCHRONOUS RECTIFIER CONTROL AND METHOD THEREOF

(75) Inventors: Junshan Lou, Shanghai (CN); Dezhi Jiao, Shanghai (CN); Dong Lin, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 306 days.

(21) Appl. No.: 12/861,768

(22) Filed: Aug. 23, 2010

(65) Prior Publication Data
US 2011/0051464 A1    Mar. 3, 2011

(30) Foreign Application Priority Data
Aug. 25, 2009   (TW) ............................... 98128583 A

(51) Int. Cl.
*H02M 3/335*    (2006.01)
*H02M 7/217*    (2006.01)

(52) U.S. Cl. .................... 363/21.04; 363/20; 363/21.01; 363/21.06; 363/21.08; 363/21.14; 363/84; 363/89; 363/125; 363/127

(58) Field of Classification Search .................... 363/20, 363/21.01, 21.04, 21.06, 21.08, 21.14, 84, 363/89, 125, 127
See application file for complete search history.

(56) References Cited

U.S. PATENT DOCUMENTS

| | | | | |
|---|---|---|---|---|
| 6,490,183 B2 * | 12/2002 | Zhang | ............................. | 363/89 |
| 6,940,738 B2 * | 9/2005 | Huang et al. | ................... | 363/127 |
| 7,193,866 B1 * | 3/2007 | Huang et al. | .................... | 363/22 |
| 7,408,796 B2 * | 8/2008 | Soldano | ......................... | 363/127 |
| 7,706,156 B2 * | 4/2010 | Hsieh et al. | ................. | 363/21.02 |
| 7,760,521 B2 * | 7/2010 | Huang | ............................ | 363/22 |
| 2005/0248964 A1 * | 11/2005 | Dalal | ......................... | 363/21.08 |
| 2008/0285312 A1 * | 11/2008 | Fu et al. | ..................... | 363/21.06 |
| 2009/0109711 A1 * | 4/2009 | Hsu | ............................ | 363/21.14 |
| 2009/0290397 A1 * | 11/2009 | Hua et al. | ..................... | 363/127 |
| 2010/0027298 A1 * | 2/2010 | Cohen | ........................ | 363/21.14 |

* cited by examiner

*Primary Examiner* — Bao Q Vu

(57) ABSTRACT

The configurations of a compensation device configured in a circuit having a synchronous rectifier (SR), a controller and a load, and a compensation method thereof are provided in the present invention. In the proposed circuit, the SR includes a first terminal, a first inductor electrically connected to the first terminal in series, a second terminal and a second inductor electrically connected to the second terminal in series, the controller is coupled to the first and the second inductors, and the device includes a voltage source having a positive terminal coupled to the controller and a negative terminal coupled to the second inductor and providing a compensation voltage to reduce or eliminate the influence of the first and the second inductors towards a voltage value across the first and the second terminals.

25 Claims, 12 Drawing Sheets

US 8,300,430 B2

COMPENSATION DEVICE FOR SYNCHRONOUS RECTIFIER CONTROL AND METHOD THEREOF

FIELD OF THE INVENTION

The present invention relates to a compensation device for a synchronous rectifier, and more particularly to a voltage compensation device for a synchronous rectifier.

BACKGROUND OF THE INVENTION

The synchronous rectification circuits are employed to improve the efficiency of the power supply apparatus, especially in applications having low voltage and large output current. Thus, the applications of the synchronous rectification circuits are more and more intensive, and the improvements aimed at overcoming their drawbacks are taken more seriously nowadays. For example, FIG. 1 shows a schematic circuit diagram of a flyback converter having a synchronous rectifier and free from a parasitic inductor in the prior art, in which the flyback converter receives an input voltage Vin and comprises an input capacitor Ci, a conversion circuit stage, a transformer Tr, a synchronous rectification circuit, an output circuit stage and a load RL. The conversion circuit stage comprises a resistor Rs, a capacitor Cs and a transistor Q0. The synchronous rectification circuit comprises a synchronous rectifier Q1 having a first terminal D, a second terminal S and a control terminal G (e.g., a MOSFET, in which D is its drain, S is its source, and G is its gate), resistors Rdc, Rg and RMOT, a capacitor Cdc and a controller UI (e.g., an IC: IR1166S). The output circuit stage comprises an output capacitor Co.

Usually, a voltage across terminals D and S, VDS, is known to be equal to iDS*Rdson, which means VDS is linearly proportional to iDS, in which Rdson is the resistance when Q1 is turned on. That is to say:

$$VDS = Rdson * (iDS) \qquad (1)$$

FIG. 2 shows the corresponding waveforms of the synchronous rectifier Q1 in FIG. 1. VTH1 is a threshold voltage, and VG is the gate voltage. Q1 is turned off when VDS=VTH1.

However, in fact, when a circuit has a synchronous rectifier comprising a drain and a source, each of which is coupled to an inductor in series, for example, a flyback converter has a synchronous rectifier comprising a drain and a source, each of which comprises a parasitic inductor (as shown in FIG. 3, the remaining elements are the same as those of FIG. 1 except for the first and the second parasitic inductors L1 and L2), a measured value of VDS obtained via sampling is:

$$VDS = iDS * Rdson + (L1+L2) * d(iDS)/dt \qquad (2)$$

FIG. 4 shows a waveform diagram of the corresponding waveforms of the synchronous rectifier Q1 in FIG. 3, in which VDS1 is the sampled voltage across DS of Q1 under the circumstances of considering the parasitic inductors, VG1 is the driving voltage of Q1 under the circumstances of considering the parasitic inductors, VDS2 is the sampled voltage across DS of Q2 under the circumstances of not considering the parasitic inductors and VG2 is the driving voltage of Q2 under the circumstances of not considering the parasitic inductors. There are significant differences between the two states of considering and not considering the parasitic inductors respectively.

It is possible that there are external inductors connected to the drain and the source of the synchronous rectifier in series in the realistic applications, that is to say, L1 and L2 are the first external inductor and the second external inductor at the moment, and if the voltage across terminals D and S is sampled, the influence of the first external inductor and the second external inductor towards the voltage VDS are the same as the influence of the first parasitic inductor and the second parasitic inductor towards the voltage VDS as shown in FIG. 3. Besides, the external inductor L1 or L2 could be zero.

FIG. 5 shows a circuit diagram of a resonant converter having a synchronous rectifier in the prior art, in which the resonant converter receives an input voltage Vi, and comprises switching switches Q1 and Q2, a conversion circuit stage, a transformer Tr, a synchronous rectification circuit, an output circuit stage and a load RL. The conversion circuit stage comprises a capacitor Cs, a resonant inductor Ls (its resonant voltage is Vr, and its resonant current is ir), and a magnetic inductor Lm having a magnetic current of im. The synchronous rectification circuit comprises two synchronous rectifiers S1 (including a body diode D1 and a capacitor C1, the current flowing through S1 is is1) and S2 (including a body diode D2 and a capacitor C2, the current flowing through S2 is is2). The output circuit stage comprises an output capacitor Co having a function of output filtering. Surely, the output circuit stage could further comprise a stage or even multiple stages of filter circuit comprising inductors and capacitors and connected between the output capacitor Co and the load in the realistic applications. FIG. 6 shows a waveform diagram of the relative waveforms of the resonant converter in FIG. 5, in which Vgp is the gate voltage of the primary side switches (Q1 and Q2), Vgs is the gate voltage of the secondary side switches (synchronous rectifiers S1 and S2). As shown in FIG. 6, the current flowing through the secondary side switches (synchronous rectifiers S1 and S2) of the transformer Tr is similar to a sinusoidal wave in a resonant converter. Thus, (L1+L2)*d(iDS)/dt is varied according to different load conditions.

Keeping the drawbacks of the prior arts in mind, and employing experiments and research full-heartily and persistently, the applicants finally conceived a compensation device for synchronous rectifier control and method thereof.

SUMMARY OF THE INVENTION

It is therefore an object of the present invention to provide a compensation device for synchronous rectifier and method thereof. Through providing a compensation voltage, an influence of the parasitic inductors connected to the source and the drain of the synchronous rectifier in series towards the voltage across the source and the drain of the synchronous rectifier is either eliminated or decreased.

According to the first aspect of the present invention, a synchronous rectification circuit comprises a synchronous rectifier having a first and a second terminals, a first inductor having a first terminal and a second terminal connected to the first terminal of the synchronous rectifier, a second inductor having a first terminal connected to the second terminal of the synchronous rectifier and a second terminal, a controller coupled to the first and the second inductors, and receiving and comparing a sensed voltage signal measured across the first terminal of the first inductor and the second terminal of the second inductor and reflecting a voltage across the first and the second terminals of the synchronous rectifier, a threshold voltage signal and a compensation voltage signal to obtain a control signal to control the synchronous rectifier, and a compensation device providing the compensation voltage signal having at least one of functions of mitigating an influence of the first and the second inductors towards the sensed voltage signal and reducing the influence to zero.

Preferably, the first and the second inductors are one of a first and a second parasitic inductors and a first and a second external inductors, and the sensed voltage signal includes the influence of the first and the second inductors.

Preferably, the first and the second inductors are respectively a first external and a second external inductors having respective inductances, one of which is higher than or equal to zero.

Preferably, the controller comprises a comparator having a first input terminal receiving a first synthesized signal being a sum of a voltage signal on the first terminal of the first inductor and the compensation voltage signal, a second input terminal receiving a second synthesized signal being a sum of a voltage signal on the second terminal of the second inductor and the threshold voltage signal, and an output terminal generating the control signal, and a threshold voltage source having a positive and a negative terminals and providing the threshold voltage signal.

Preferably, the controller comprises a comparator having a first input terminal receiving a voltage signal on the first terminal of the first inductor, a second input terminal receiving a synthesized signal being a sum of a voltage signal on the second terminal of the second inductor, the threshold voltage signal and the compensation voltage signal, and an output terminal generating the control signal, and a threshold voltage source having a positive and a negative terminals and providing the threshold voltage signal.

Preferably, the circuit is a flyback converter having a transformer and an output stage, wherein the synchronous rectifier is coupled to between the transformer and the output stage, and the compensation voltage signal has a constant voltage value.

Preferably, the circuit is a resonant converter having a transformer, an output stage and a load, wherein the synchronous rectifier is coupled to between the transformer and the output stage, and the compensation voltage signal reflects a status of the load of the resonant converter.

Preferably, the resonant converter is an LLC resonant converter having an operational frequency being fs, the first inductor has an inductance being L1, the second inductor has an inductance being L2, the circuit has an output current being Io, at a specific moment t, the provided compensation voltage signal (Vcomp) is $-(L1+L2) \cdot \pi^2 Io \cdot fs \cdot \cos(2\pi \cdot fs \cdot t)$, and a turn-on and a turn-off of the synchronous rectifier are controlled by the controller.

Preferably, the controller controls the synchronous rectifier to be turned off at the specific moment t being $1/(2fs)$.

Preferably, the load has a first and a second terminals and the compensation device comprises a first resistor having a first terminal coupled to the first terminal of the load and sampling an output current of the load and a second terminal, a second resistor having a first terminal coupled to the second terminal of the first resistor and a second terminal, a third resistor having a first terminal coupled to the second terminal of the load and a second terminal, and an operational amplifier having a first input terminal coupled to the first terminal of the second resistor, a second input terminal coupled to the second terminal of the third resistor and an output terminal coupled to the controller and the second terminal of the second resistor, and providing the compensation voltage signal.

Preferably, the circuit is a resonant converter having a transformer, an output stage and a load, wherein the synchronous rectifier is coupled to between the transformer and the output stage, and the compensation voltage signal reflects a status of the load of the resonant converter.

Preferably, the resonant converter is an LLC resonant converter having an operational frequency being fs, the first inductor has an inductance being L1, the second inductor has an inductance being L2, the circuit has an output current being Io, at a specific moment t, the provided compensation voltage signal (Vcomp) is $(L1+L2) \cdot \pi^2 Io \cdot fs \cdot \cos(2\pi \cdot fs \cdot t)$, and a turn-on and a turn-off of the synchronous rectifier are controlled by the controller.

Preferably, the controller controls the synchronous rectifier to be turned off at the specific moment t being $1/(2fs)$.

According to the second aspect of the present invention, a compensation method for a circuit having a synchronous rectifier, wherein the synchronous rectifier has a first terminal and a second terminal, the circuit further comprises a first inductor having a first terminal and a second terminal coupled to the first terminal of the synchronous rectifier and a second inductor having a first terminal coupled to the second terminal of the synchronous rectifier and a second terminal, and the method comprises the steps of: (a) providing a threshold voltage value (VTH), a compensation voltage value (Vcomp) and a sensed voltage value (VDS) measured across the first terminal of the first inductor and the second terminal of the second inductor and reflecting a voltage across the first and the second terminals of the synchronous rectifier; (b) eliminating an influence of the first and the second inductors towards the sensed voltage value by the Vcomp; and (c) comparing the VDS, the VTH and the Vcomp to obtain a control signal so as to turn on/off the synchronous rectifier at a specific moment accordingly.

Preferably, the first and the second inductors are one of a first and a second parasitic inductors and a first and a second external inductors.

Preferably, the circuit further comprises a comparator having a first and a second input terminals and an output terminal, a compensation voltage source having a first and a second terminals and providing the Vcomp, and a threshold voltage source having a positive and a negative terminals and providing the VTH, the first input terminal is coupled to the first terminal of the first inductor, the second input terminal is coupled to the positive terminal of the threshold voltage source, the second terminal of the compensation voltage source is coupled to the negative terminal of the threshold voltage source, the first terminal of the compensation voltage source is coupled to the second terminal of the second inductor, the output terminal generates the control signal, and the step (c) further comprises a step of (c1) comparing the VDS, the Vcomp and the VTH to generate the control signal.

Preferably, the circuit further comprises a comparator having a first and a second input terminals and an output terminal, a compensation voltage source having a first and a second terminals and providing the Vcomp, and a threshold voltage source having a positive and a negative terminals and providing the VTH, the first input terminal is coupled to the second terminal of the compensation voltage source, the first terminal of the compensation voltage source is coupled to the first terminal of the first inductor, the second input terminal is coupled to the positive terminal of the threshold voltage source, the negative terminal of the threshold voltage source is coupled to the second terminal of the second inductor, the output terminal generates the control signal, and the step (c) further comprises the step of (c1) comparing the VDS, the Vcomp and the VTH to generate the control signal.

Preferably, the step (c) further comprises the steps of: (c2) providing an on-resistance Rdson of the synchronous rectifier and an on-state current iDS flowing through the synchronous rectifier; and (c3) turning off the synchronous rectifier when an absolute value of VTH is not smaller than an absolute value of a product of the iDS multiplied by the Rdson.

Preferably, the circuit is a resonant converter having a transformer and an output stage, the synchronous rectifier is coupled between the transformer and the output stage, and the step (a) further comprises the steps of: (a1) providing an operational frequency being fs of the converter, an inductance being L1 of the first inductor, an inductance being L2 of the second inductor, an output current being Io of the converter and a moment being t; and (a2) performing one of providing the Vcomp having a value of $(L1+L2) \cdot \pi 2 Io \cdot fs \cdot \cos(2\pi \cdot fs \cdot t)$ to the first terminal of the first inductor and providing the Vcomp having a value of $-(L1+L2) \cdot \pi^2 Io \cdot fs \cdot \cos(2\pi \cdot fs \cdot t)$ to the second terminal of the second inductor.

Preferably, the circuit further comprises a controller being a digital signal processor (DSP) and coupled to the first and the second inductors.

Preferably, the circuit is a flyback converter having a transformer and an output stage, the synchronous rectifier is coupled between the transformer and the output stage, and the step (a) further comprises a step of (a1) providing the Vcomp having a value of a constant to one of the first terminal of the first inductor and the second terminal of the second inductor.

According to the third aspect of the present invention, a compensation method for a circuit having a synchronous rectifier, and a first and a second inductors, wherein the synchronous rectifier has a first terminal and a second terminal, the first inductor has a first terminal and a second terminal coupled to the first terminal of the synchronous rectifier, and the second inductor has a first terminal coupled to the second terminal of the synchronous rectifier and a second terminal, and the method comprises the steps of: (a) providing a threshold voltage value (VTH), a compensation voltage value (Vcomp) and a sensed voltage value (VDS) measured across the first terminal of the first inductor and the second terminal of the second inductor and reflecting a voltage across the first and the second terminals of the synchronous rectifier; and (b) reducing an influence of the first and the second inductors towards the sensed voltage value by the Vcomp.

Preferably, the method further comprises a step of comparing the VDS, the VTH and the Vcomp to turn on/off the synchronous rectifier at a specific moment accordingly.

The present invention may best be understood through the following descriptions with reference to the accompanying drawings, in which:

BRIEF DESCRIPTION OF THE DRAWINGS

FIG. 11 shows a portion of circuit diagram between D and S when Q1 of the resonant converter as shown in FIG. 9 is turned on;

DETAILED DESCRIPTION OF THE PREFERRED EMBODIMENT

Figure 7:
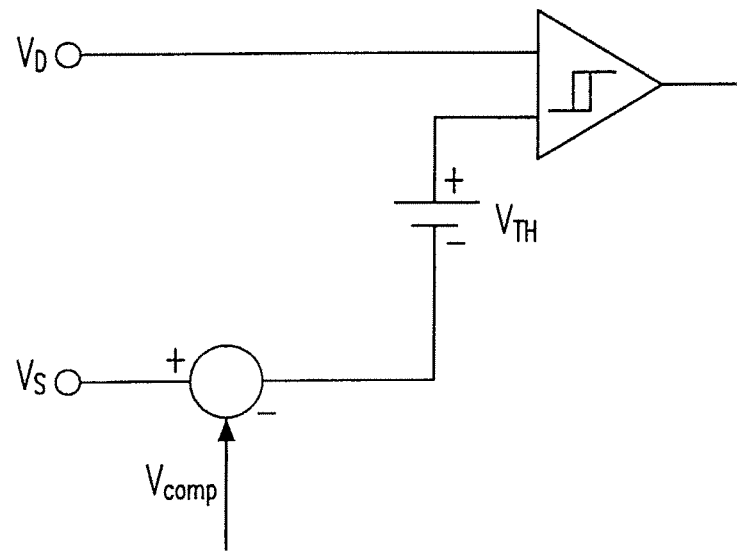
FIG. 7 shows a first equivalent circuit diagram according to the basic principles of the present invention.

Please refer to FIG. 7, it is a first equivalent circuit diagram according to the basic principles of the present invention, and it is a comparator. Before comparing VDS (=VD−VS) with a threshold voltage VTH, a compensation voltage Vcomp related to iDS (that is −iSD) is added to the VS terminal so as to eliminate or decrease the influence of the parasitic inductors.

Figure 8:
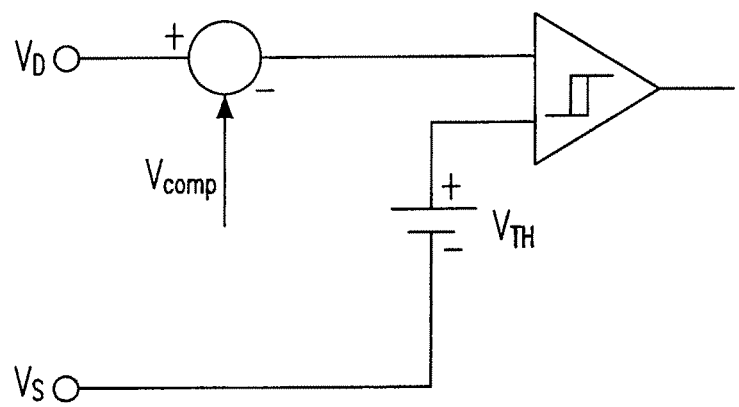
FIG. 8 shows a second equivalent circuit diagram according to the basic principles of the present invention.

Please refer to FIG. 8, it is a second equivalent circuit diagram according to the basic principles of the present invention, and it is a comparator also. Before comparing VDS (=VD−VS) with a threshold voltage VTH, a compensation voltage Vcomp related to iDS is added to the VD terminal so as to eliminate or decrease the influence of the parasitic inductors.

In FIGS. 7 and 8, the amount and the positive and negative of Vcomp (that is, Vcomp is larger than zero or less than zero) are determined by the influences of the parasitic inductors required to be decreased or eliminated.

Figure 5:
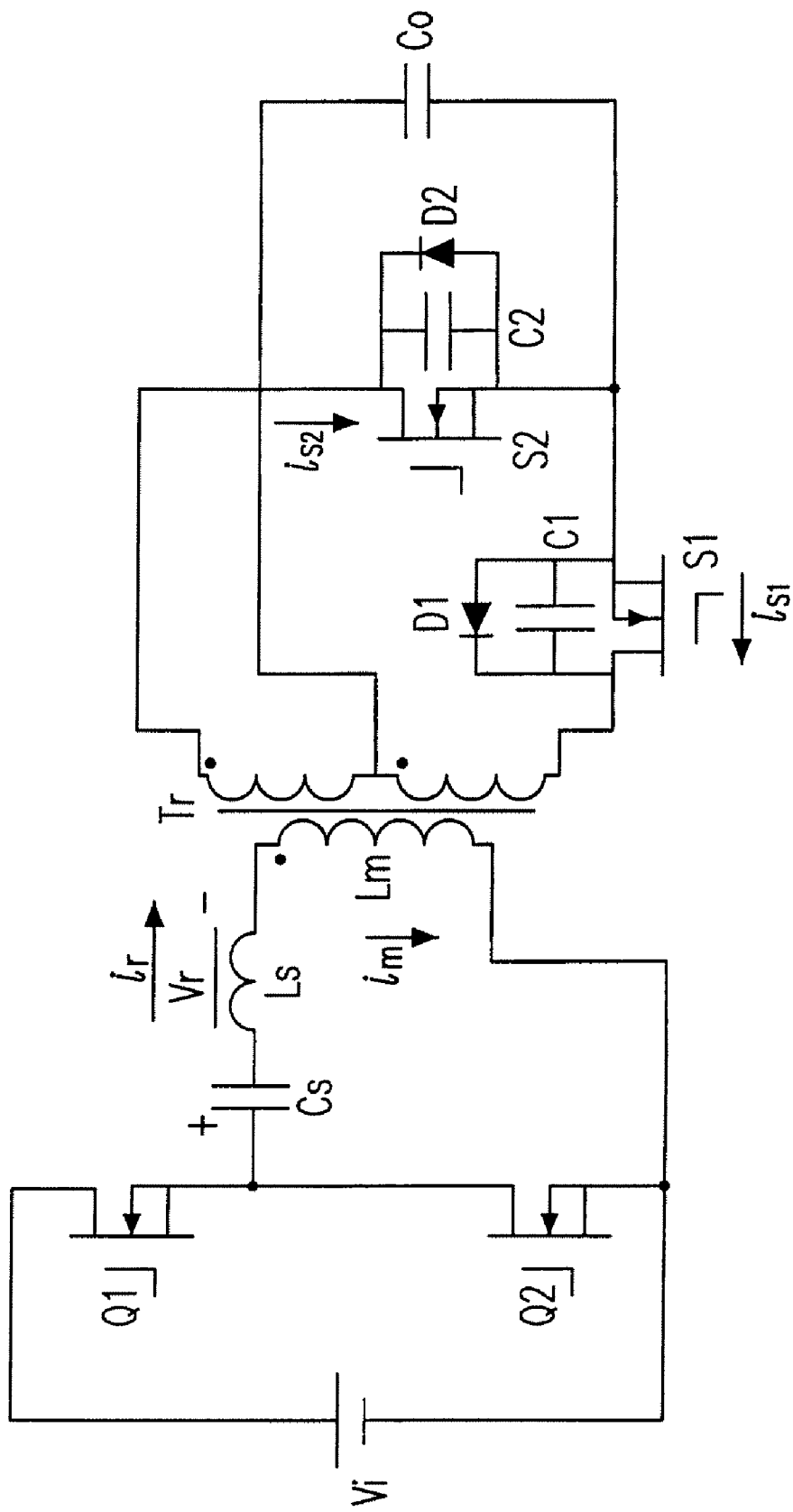
FIG. 5 shows a circuit diagram of a resonant converter having a synchronous rectifier in the prior art.
Figure 6:
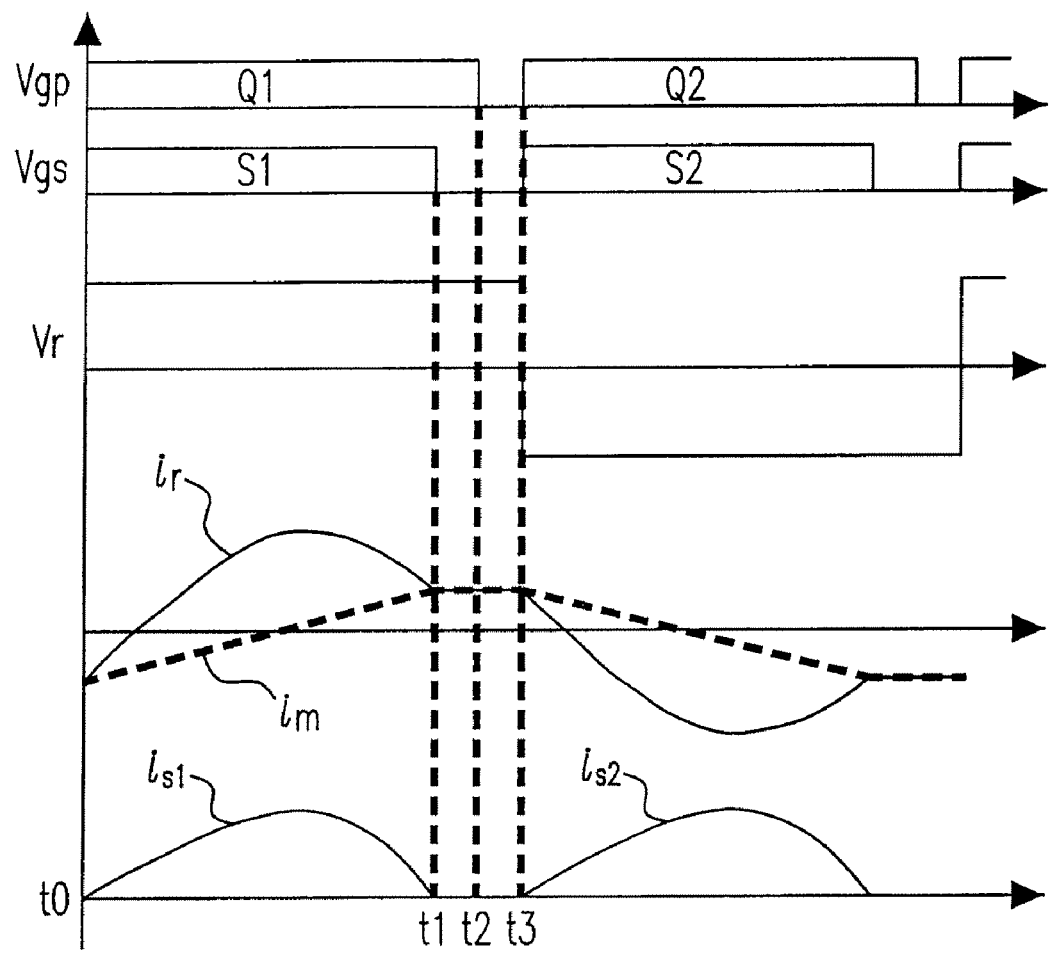
FIG. 6 shows a waveform diagram of the relative waveforms of the resonant converter in FIG. 5.
Figure 9:
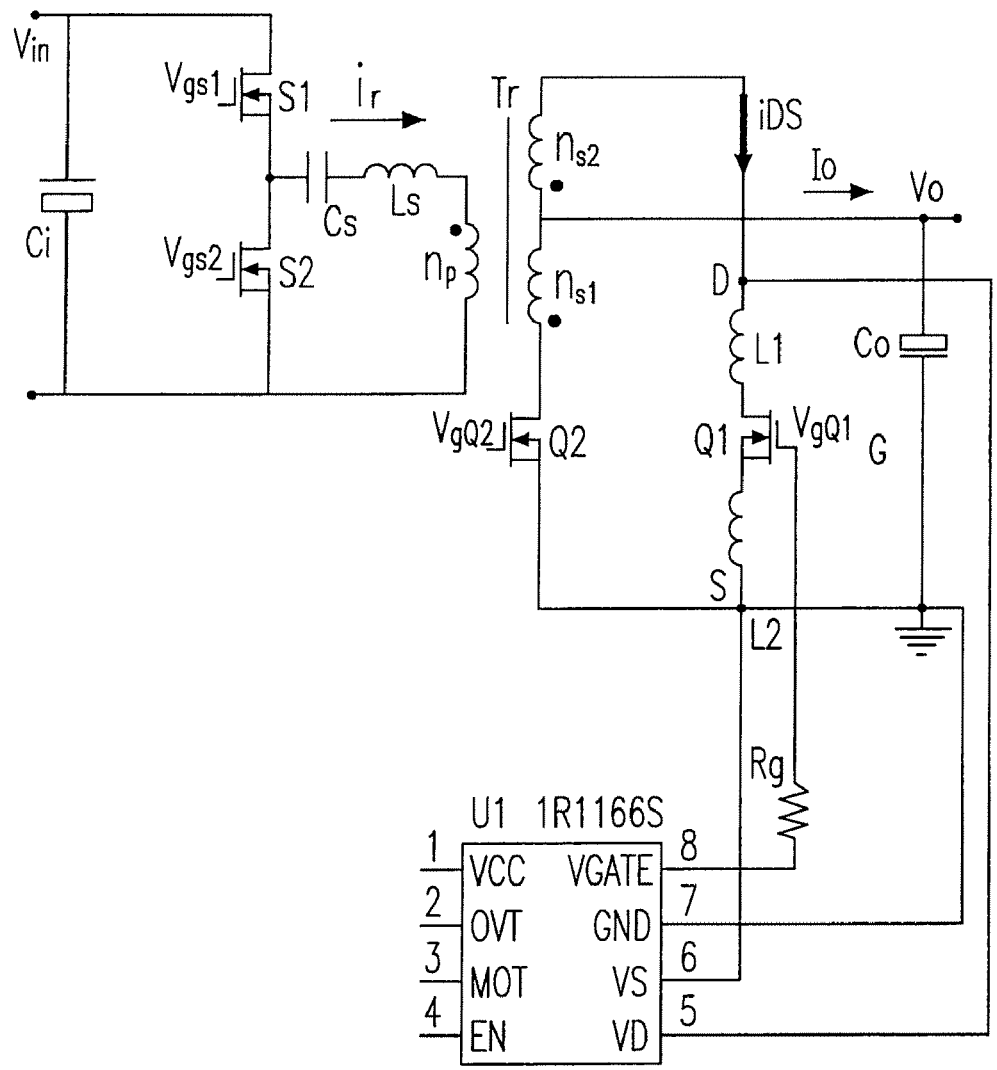
FIG. 9 shows a circuit diagram of a resonant converter having a synchronous rectifier and parasitic inductors in the prior art.

FIG. 9 shows a circuit diagram of a resonant converter having a synchronous rectifier and inductors connected to the rectifier in series, e.g., parasitic inductors (e.g., an LLC resonant converter) in the prior art, in which the differences between this resonant converter and the resonant converter of FIG. 5 are that the switching switches on the primary side of Tr are changed to S1 and S2, the gate voltages of which are Vgs1 and Vgs2 respectively, the magnetic inductor Lm in FIG. 5 is replaced by the primary winding np of Tr, the secondary windings of Tr are shown as ns1 and ns2, the secondary side rectifiers are Q1 and Q2, and the gate voltages of which are VgQ1 and VgQ2. Using the rectifier Q1 as an example to elaborate how to decrease the influence of parasitic inductors toward the turn-off of Q1. The parasitic inductors L1 and L2 are connected to the drain and the source of Q1 in series, and coupled to a controller (U1, e.g., IC: IR1166S) at the terminals D and S, and the resonant current ir, the output current io and the current flowing from D to S of Q1, iDS, are all shown.

Figure 10:
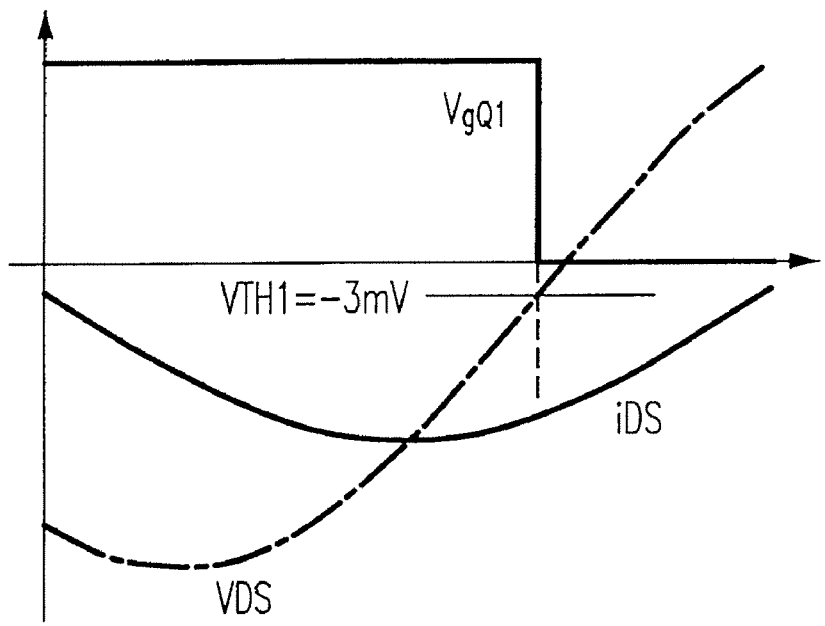
FIG. 10 shows a waveform diagram of the relative waveforms of the resonant converter as shown in FIG. 9.

FIG. 10 shows a waveform diagram of the relative waveforms of the resonant converter as shown in FIG. 9, in which VDS is leading iDS (that is −iSD) for a specific angle (it is a phase angle). Thus, iDS is less than VTH1/Rdson (the absolute value of iDS is larger than the absolute value of VTH1/Rdson) when VDS equals to VTH1, and Q1 is turned off at the moment, that is to say, Q1 is turned off early and iDS is not reaching zero yet such that the loss of the circuit is enlarged.

Figure 11:
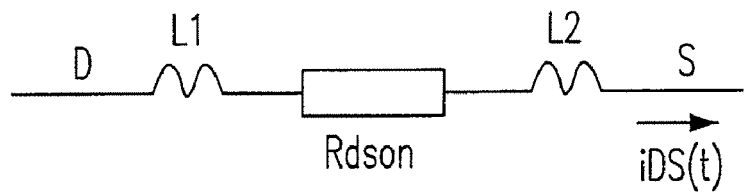

FIG. 11 shows a circuit diagram of L1, Rdson and L2 between D and S when Q1 as shown in FIG. 9 is turned on, in which iDS(t) is the iDS value at a specific moment t, and the positive direction is flowing from terminal D to terminal S, in which:

$$iDS(t) = \left(\frac{\pi}{2}\right) Io \cdot \sin(2\pi \cdot fs \cdot t) \quad (3)$$

$$VL = (L1 + L2)\left(\frac{diDS(t)}{dt}\right) \quad (4)$$
$$= (L1 + L2) \cdot \pi^2 Io \cdot fs \cdot \cos(2\pi \cdot fs \cdot t)$$

$$VDS = Rdson \cdot iDS(t) + VL \quad (5)$$

When $t = \frac{1}{(2fs)}$, $\quad (6)$ $$VL = -(L1 + L2) \cdot \pi^2 Io \cdot fs$$

At the moment, the compensation voltage is set up according to the method of FIG. 7:

$$Vcomp = -VL = (L1+L2) \cdot \pi^2 Io \cdot fs \quad (7)$$

And, the compensation voltage is set up according to the method of FIG. 8:

$$Vcomp = VL = -(L1+L2) \cdot \pi^2 Io \cdot fs \quad (8)$$

In the above-mentioned equations, fs is the operational frequency of the resonant converter, Rdson·iDS(t) is the voltage drop across the on-resistance Rdson of Q1, and VL=VL1+VL2, in which VL1 is the voltage drop across L1, and VL2 is the voltage drop across L2.

Figure 12:
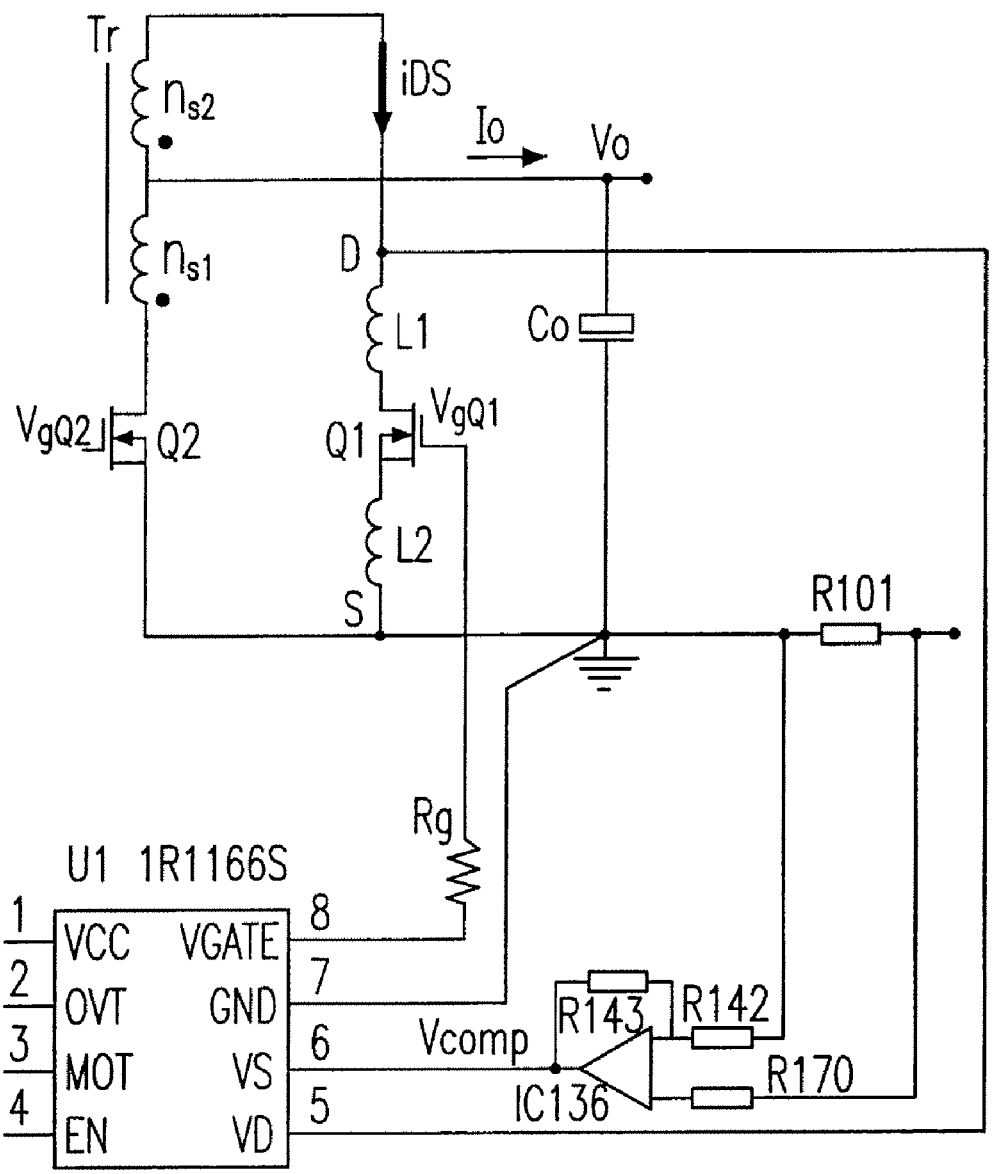
FIG. 12 shows a portion of schematic circuit diagram of a resonant converter having parasitic inductors and a voltage compensation circuit according to the first preferred embodiment of the present invention.

FIG. 12 shows a portion of schematic circuit diagram of a resonant converter having parasitic inductors and a voltage compensation circuit according to the first preferred embodiment of the present invention, it only shows the circuit after the secondary side of the transformer Tr, the circuit on the primary side of the transformer Tr is the same as that of FIG. 9, and the only difference between the circuit after the secondary side of Tr and that of FIG. 9 is that the sixth pin of U1 is changed from coupled to the terminal S to coupled to a voltage compensation circuit so as to receive a compensation voltage Vcomp. The voltage compensation circuit comprises resistors R101, R142, R143 and R170 and an operational amplifier (e.g., IC136). Due to that the compensation method is similar to that of FIG. 7, according to the aforementioned equation (7):

$$Vcomp = -VL = (L1 + L2) \cdot \pi^2 Io \cdot fs \quad (9)$$
$$= Io \cdot R101 \cdot \frac{(R143 + R142)}{R142}$$

$$R143 = \left(\frac{R142}{R101}\right)((L1 + L2) \cdot \pi^2 \cdot fs - R101) \quad (10)$$

Io is sampled by R101, R142, R143 and the operational amplifier IC136 to compensate VL.

Since VL is linear proportional to the output current Io, in order to turn off Q1 at a specific moment t=½fs, that is to say, iDs almost equals to zero at the moment, R101 is the load having a known value, and R142 and R143 could be chosen according to equation (10).

Then the influence of parasitic inductors L1 and L2 are reduced.

Io could be sampled by other methods such as to employ a current transformer (CT) on the primary side of the transformer Tr to sample the output current Io.

Figure 13:
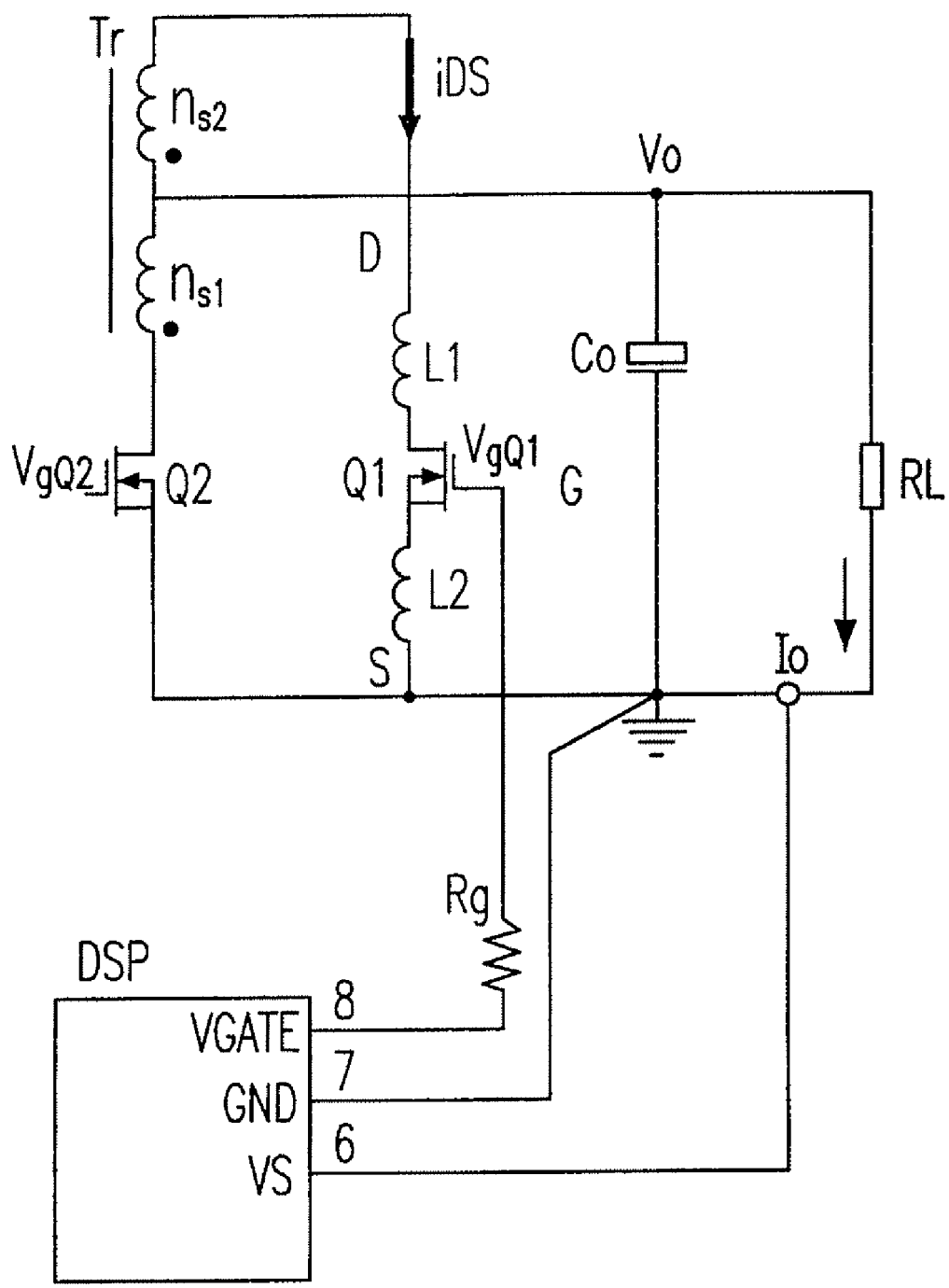
FIG. 13 shows a portion of schematic circuit diagram of a resonant converter having parasitic inductors and a voltage compensation circuit according to the second preferred embodiment of the present invention.

FIG. 13 shows a portion of schematic circuit diagram of a resonant converter having parasitic inductors and a voltage compensation circuit according to the second preferred embodiment of the present invention, it only shows the circuit on the secondary side of the transformer Tr, the circuit on the primary side of the transformer is the same as that of FIG. 9, and the only difference between the circuit on the secondary side of Tr and that of FIG. 9 is that the controller U1 is replaced by a digital control unit (e.g., a digital signal processor: DSP). The operational principle of the circuit at each moment could be deduced and inputted to the digital control unit. Thus the voltage across the parasitic inductor can be compensated according to the related equations. For example, in an LLC series resonant converter, according to the above-mentioned equations:

$$VL = (L1 + L2)\left(\frac{diDS(t)}{dt}\right) \quad (4)$$
$$= (L1 + L2) \cdot \pi^2 Io \cdot fs \cdot \cos(2\pi \cdot fs \cdot t)$$

After Io is sampled, VL could be calculated at every time point. Then, $$VSDr = -VDS - VL \quad (11)$$

So, after removing the influence of the parasitic inductors, the synchronous rectifiers can be turned off at suitable time points when VSDr is larger than a specific threshold value.

Figure 1:
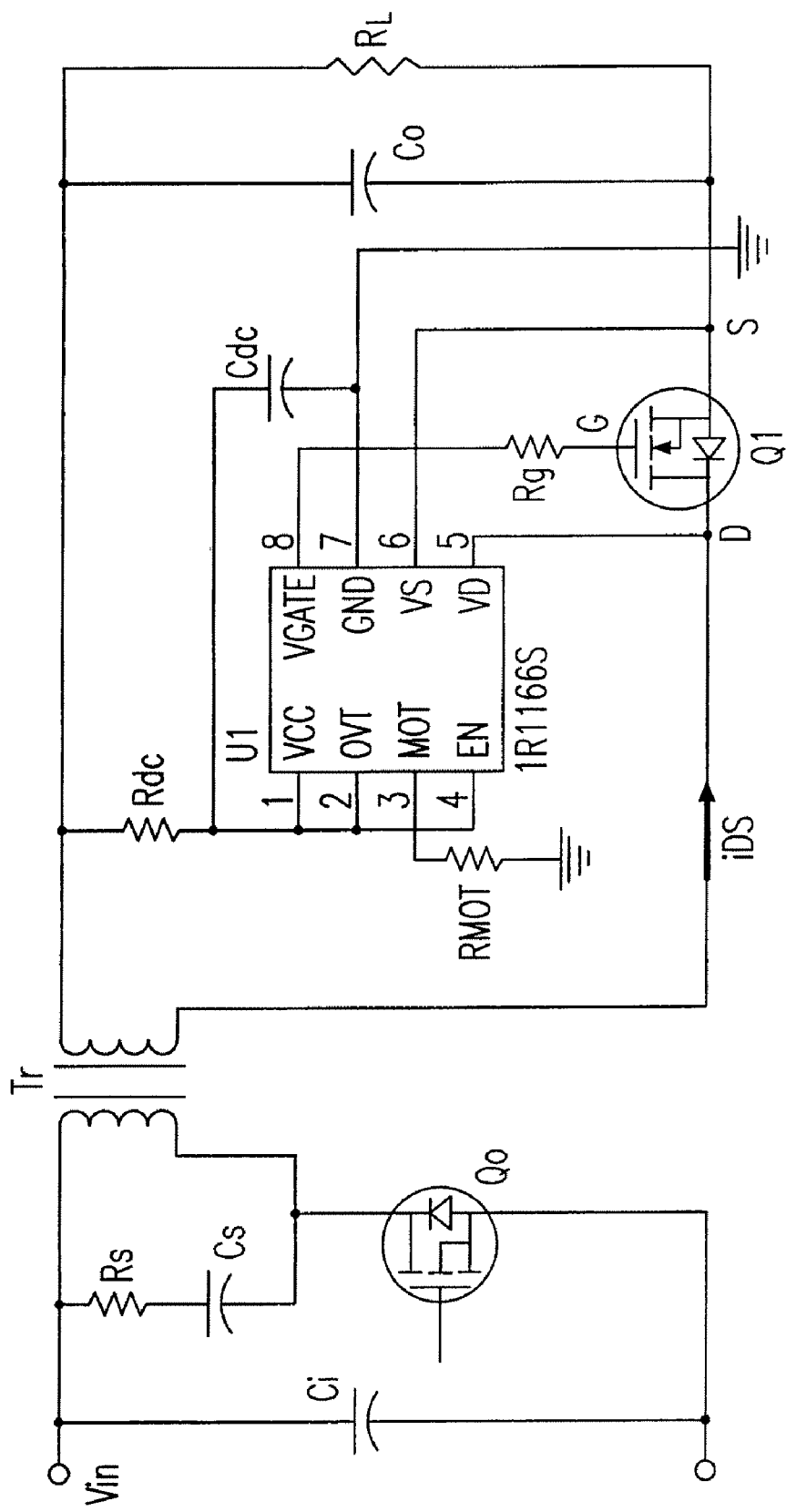
FIG. 1 shows a schematic circuit diagram of a flyback converter having a synchronous rectifier and free from a parasitic inductor in the prior art.
Figure 2:
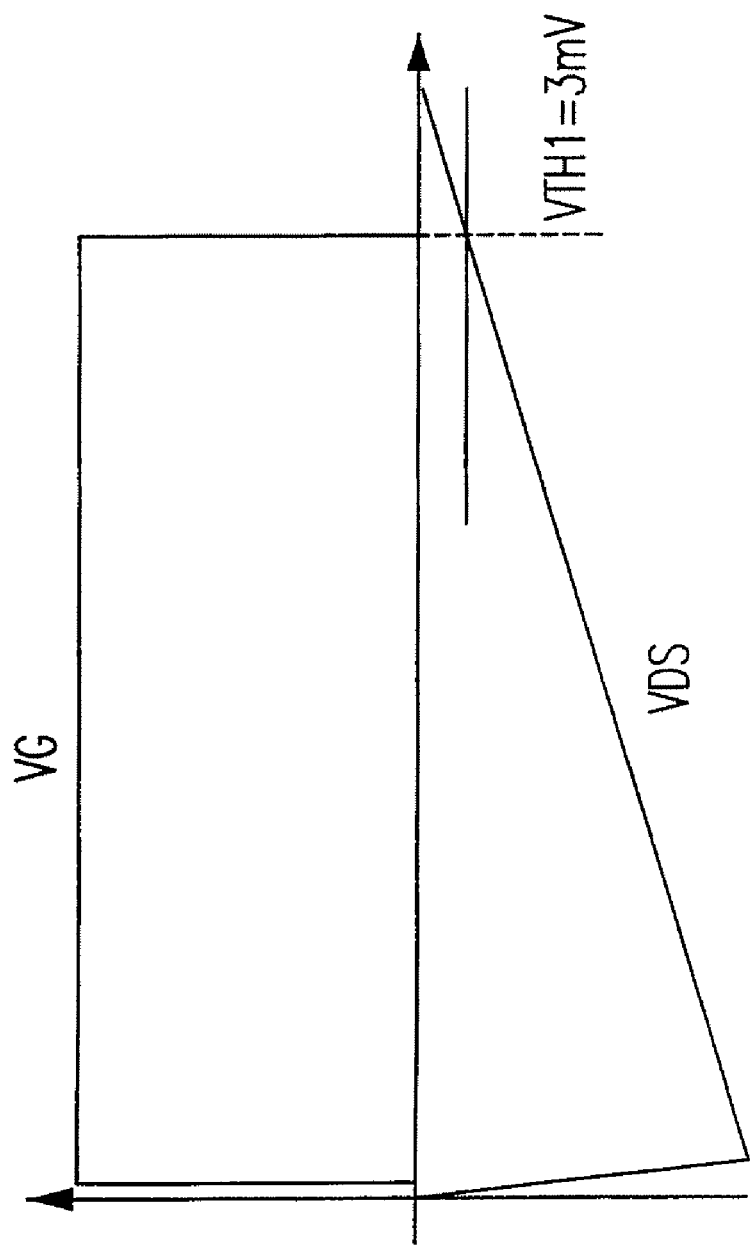
FIG. 2 shows a waveform diagram of the corresponding waveforms of the synchronous rectifier Q1 in FIG. 1.
Figure 3:
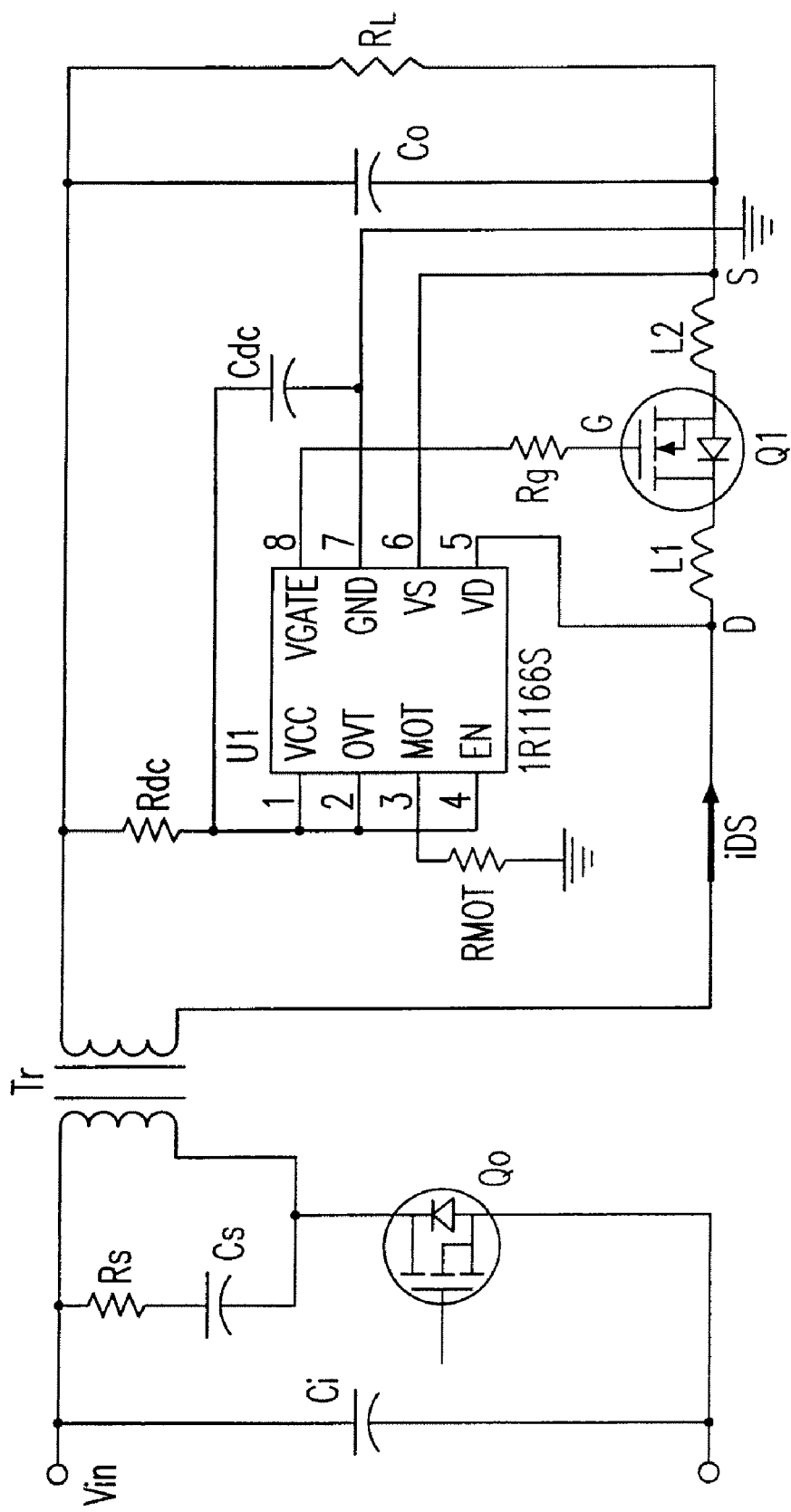
FIG. 3 shows a schematic circuit diagram of a flyback converter having a synchronous rectifier comprising parasitic inductors in the prior art.
Figure 4:
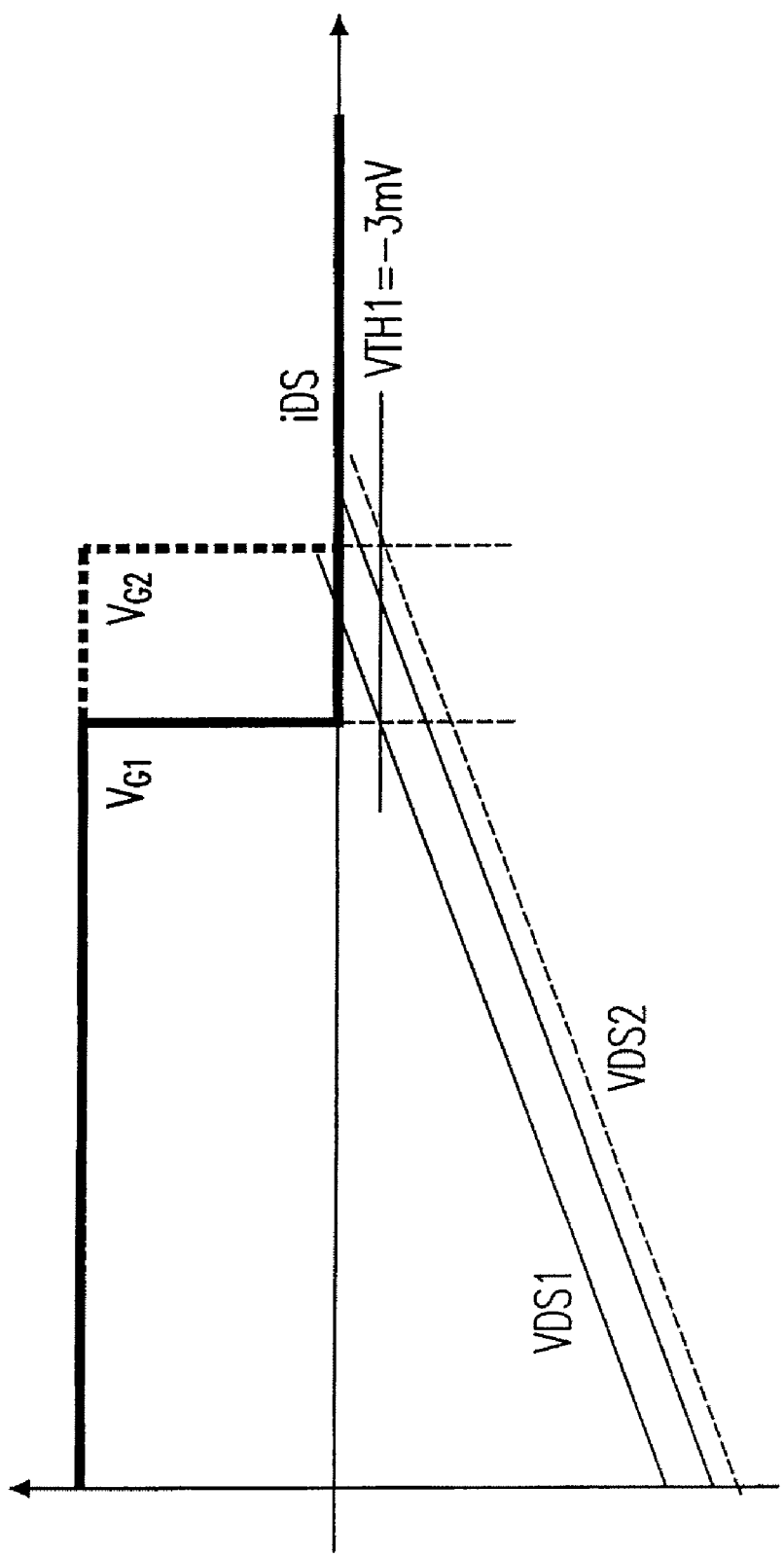
FIG. 4 shows a waveform diagram of the corresponding waveforms of the synchronous rectifier Q1 in FIG. 3.
Figure 14:
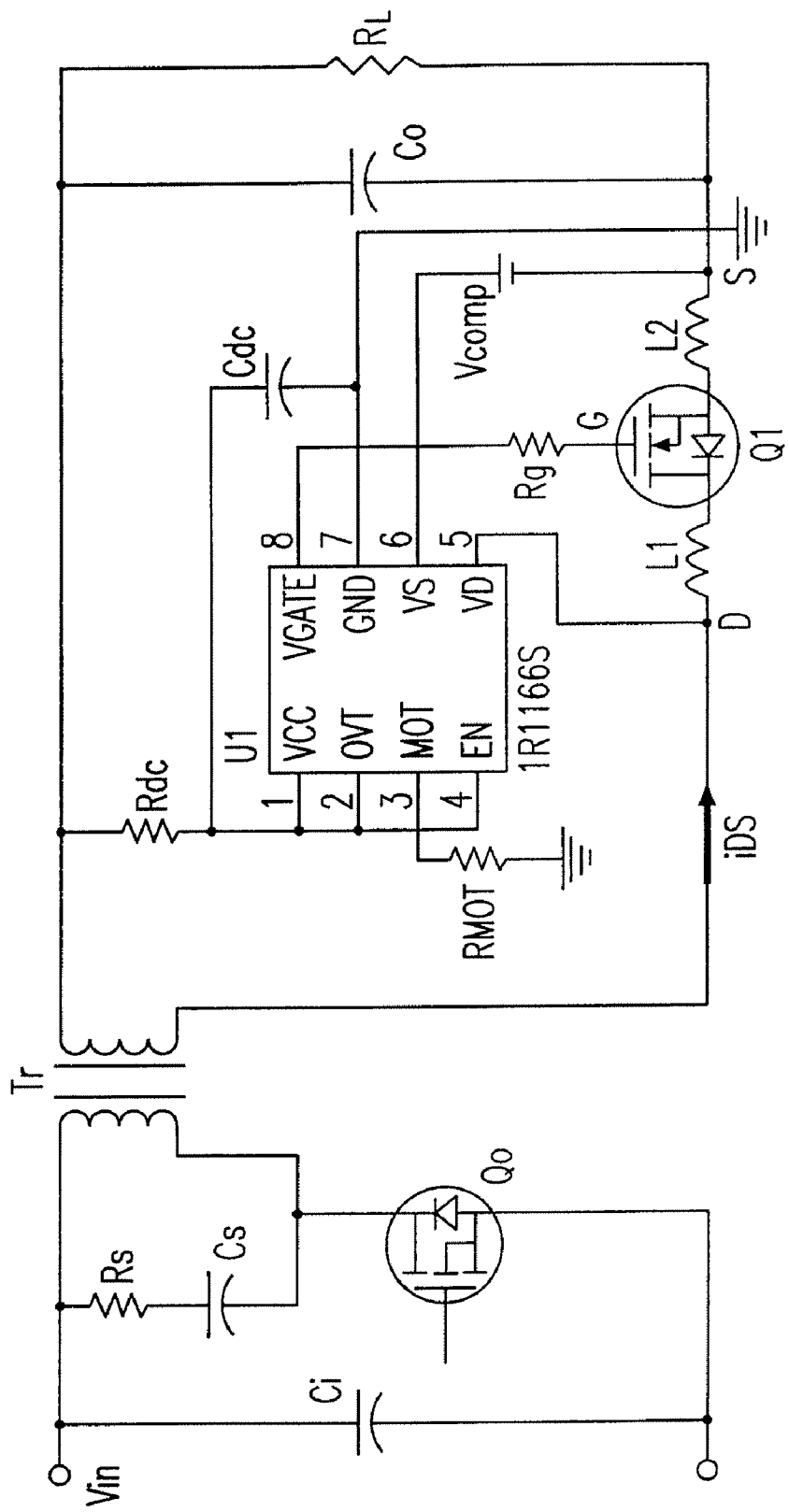
FIG. 14 shows a schematic circuit diagram of a flyback converter having parasitic inductors and a voltage compensation circuit according to the third preferred embodiment of the present invention.

FIG. 14 shows a schematic circuit diagram of a flyback converter having parasitic inductors and a voltage compensation circuit according to the third preferred embodiment of the present invention. The difference between FIG. 14 and FIG. 3 is that there is a voltage compensation circuit in FIG. 14 (it is a voltage signal Vcomp, the positive terminal of which is connected to the sixth pin of the controller U1, the negative terminal of which is connected to the parasitic inductor L2, and equals to a DC voltage source as shown in FIG. 7). To a flyback converter, the slope of iDS(t) is almost not changed after the primary side switch Q0 is turned off when it is operated under a PWM mode, that is to say, diDS(t)/dt is almost kept unchanged, a constant compensation voltage Vcomp could be added at the sixth pin, the VS terminal, when the flyback converter is controlled by an IC controller (e.g., IR1166S).

To reduce the influence of parasitic inductor, a threshold voltage value can also be adjusted to pre-compensate the voltage due to the parasitic inductor. For example, it is a second equivalent circuit diagram according to the basic principles of the present invention as shown in the aforementioned FIG. 8.

In all the above-mentioned preferred embodiments, they are focus on the turn-off of the synchronous rectifier, but the provided method of the present invention could also be used in the turn-on of the synchronous rectifier, or used at every time point when the synchronous rectifier is turned on.

According to the aforementioned descriptions, the present invention provides a compensation device for synchronous rectifier and method thereof. Through providing a compensation voltage, an influence of the parasitic inductors connected to the source and the drain of the synchronous rectifier in series towards the voltage across the source and the drain of the synchronous rectifier is either eliminated or decreased, which indeed possesses the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A synchronous rectification circuit, comprising:
   a synchronous rectifier having a first and a second terminals;
   a first inductor having a first terminal and a second terminal connected to the first terminal of the synchronous rectifier;
   a second inductor having a first terminal connected to the second terminal of the synchronous rectifier and a second terminal;
   a controller coupled to the first and the second inductors, and receiving and comparing a sensed voltage signal measured across the first terminal of the first inductor and the second terminal of the second inductor and reflecting a voltage across the first and the second terminals of the synchronous rectifier, a threshold voltage signal and a compensation voltage signal to obtain a control signal to control the synchronous rectifier; and
   a compensation device providing the compensation voltage signal having at least one of functions of mitigating an influence of the first and the second inductors towards the sensed voltage signal and reducing the influence to zero.

2. A circuit according to claim 1, wherein the first and the second inductors are one of a first and a second parasitic inductors and a first and a second external inductors, and the sensed voltage signal includes the influence of the first and the second inductors.

3. A circuit according to claim 1, wherein the first and the second inductors are respectively a first external and a second external inductors having respective inductances, one of which is higher than or equal to zero.

4. A circuit according to claim 1, wherein the controller comprises a comparator having a first input terminal receiving a first synthesized signal being a sum of a voltage signal on the first terminal of the first inductor and the compensation voltage signal, a second input terminal receiving a second synthesized signal being a sum of a voltage signal on the second terminal of the second inductor and the threshold voltage signal, and an output terminal generating the control signal, and a threshold voltage source having a positive and a negative terminals and providing the threshold voltage signal.

5. A circuit according to claim 4 being a flyback converter having a transformer and an output stage, wherein the synchronous rectifier is coupled to between the transformer and the output stage, and the compensation voltage signal has a constant voltage value.

6. A circuit according to claim 1, wherein the controller comprises a comparator having a first input terminal receiving a voltage signal on the first terminal of the first inductor, a second input terminal receiving a synthesized signal being a sum of a voltage signal on the second terminal of the second inductor, the threshold voltage signal and the compensation voltage signal, and an output terminal generating the control signal, and a threshold voltage source having a positive and a negative terminals and providing the threshold voltage signal.

7. A circuit according to claim 6 being a flyback converter having a transformer and an output stage, wherein the synchronous rectifier is coupled to between the transformer and the output stage, and the compensation voltage signal has a constant voltage value.

8. A circuit according to claim 5 being a resonant converter having a transformer, an output stage and a load, wherein the synchronous rectifier is coupled to between the transformer and the output stage, and the compensation voltage signal reflects a status of the load of the resonant converter.

9. A circuit according to claim 8, wherein the resonant converter is an LLC resonant converter having an operational frequency being fs, the first inductor has an inductance being L1, the second inductor has an inductance being L2, the circuit has an output current being Io, at a specific moment t, the provided compensation voltage signal (Vcomp) is $-(L1+L2)\cdot\pi^2 Io\cdot fs\cdot \cos(2\pi\cdot fs\cdot t)$, and a turn-on and a turn-off of the synchronous rectifier are controlled by the controller.

10. A circuit according to claim 9, wherein the controller controls the synchronous rectifier to be turned off at the specific moment t being $1/(2fs)$.

11. A circuit according to claim 9, wherein the load has a first and a second terminals and the compensation device comprises:
    a first resistor having a first terminal coupled to the first terminal of the load and sampling an output current of the load and a second terminal;
    a second resistor having a first terminal coupled to the second terminal of the first resistor and a second terminal;
    a third resistor having a first terminal coupled to the second terminal of the load and a second terminal; and
    an operational amplifier having a first input terminal coupled to the first terminal of the second resistor, a second input terminal coupled to the second terminal of the third resistor and an output terminal coupled to the controller and the second terminal of the second resistor, and providing the compensation voltage signal.

12. A circuit according to claim 4 being a resonant converter having a transformer, an output stage and a load, wherein the synchronous rectifier is coupled to between the transformer and the output stage, and the compensation voltage signal reflects a status of the load of the resonant converter.

13. A circuit according to claim 12, wherein the resonant converter is an LLC resonant converter having an operational frequency being fs, the first inductor has an inductance being L1, the second inductor has an inductance being L2, the circuit has an output current being Io, at a specific moment t, the provided compensation voltage signal (Vcomp) is $(L1+L2)\cdot\pi^2 Io\cdot fs\cdot \cos(2\pi\cdot fs\cdot t)$, and a turn-on and a turn-off of the synchronous rectifier are controlled by the controller.

14. A circuit according to claim 13, wherein the controller controls the synchronous rectifier to be turned off at the specific moment t being $1/(2fs)$.

15. A compensation method for a circuit having a synchronous rectifier, wherein the synchronous rectifier has a first terminal and a second terminal, the circuit further comprises a first inductor having a first terminal and a second terminal coupled to the first terminal of the synchronous rectifier and a second inductor having a first terminal coupled to the second terminal of the synchronous rectifier and a second terminal, and the method comprises the steps of:
    (a) providing a threshold voltage value (VTH), a compensation voltage value (Vcomp) and a sensed voltage value (VDS) measured across the first terminal of the first inductor and the second terminal of the second inductor and reflecting a voltage across the first and the second terminals of the synchronous rectifier;

(b) eliminating an influence of the first and the second inductors towards the sensed voltage value by the Vcomp; and (c) comparing the VDS, the VTH and the Vcomp to obtain a control signal so as to turn on/off the synchronous rectifier at a specific moment accordingly.

16. A method according to claim 15, wherein the first and the second inductors are one of a first and a second parasitic inductors and a first and a second external inductors.

17. A method according to claim 15, wherein the circuit further comprises a comparator having a first and a second input terminals and an output terminal, a compensation voltage source having a first and a second terminals and providing the Vcomp, and a threshold voltage source having a positive and a negative terminals and providing the VTH, the first input terminal is coupled to the first terminal of the first inductor, the second input terminal is coupled to the positive terminal of the threshold voltage source, the second terminal of the compensation voltage source is coupled to the negative terminal of the threshold voltage source, the first terminal of the compensation voltage source is coupled to the second terminal of the second inductor, the output terminal generates the control signal, and the step (c) further comprises a step of (c1) comparing the VDS, the Vcomp and the VTH to generate the control signal.

18. A method according to claim 15, wherein the circuit further comprises a comparator having a first and a second input terminals and an output terminal, a compensation voltage source having a first and a second terminals and providing the Vcomp, and a threshold voltage source having a positive and a negative terminals and providing the VTH, the first input terminal is coupled to the second terminal of the compensation voltage source, the first terminal of the compensation voltage source is coupled to the first terminal of the first inductor, the second input terminal is coupled to the positive terminal of the threshold voltage source, the negative terminal of the threshold voltage source is coupled to the second terminal of the second inductor, the output terminal generates the control signal, and the step (c) further comprises the step of (c1) comparing the VDS, the Vcomp and the VTH to generate the control signal.

19. A method according to claim 18, wherein the step (c) further comprises the steps of:

(c2) providing an on-resistance Rdson of the synchronous rectifier and an on-state current iDS flowing through the synchronous rectifier; and (c3) turning off the synchronous rectifier when an absolute value of VTH is not smaller than an absolute value of a product of the iDS multiplied by the Rdson.

20. A method according to claim 15, wherein the circuit is a resonant converter having a transformer and an output stage, the synchronous rectifier is coupled between the transformer and the output stage, and the step (a) further comprises the steps of:

(a1) providing an operational frequency being fs of the converter, an inductance being L1 of the first inductor, an inductance being L2 of the second inductor, an output current being Io of the converter and a moment being t; and (a2) performing one of providing the Vcomp having a value of $(L1+L2)\cdot\pi 2 Io\cdot fs\cdot \cos(2\pi\cdot fs\cdot t)$ to the first terminal of the first inductor and providing the Vcomp having a value of $-(L1+L2)\cdot\pi^2 Io\cdot fs\cdot \cos(2\pi\cdot fs\cdot t)$ to the second terminal of the second inductor.

21. A method according to claim 20, wherein the circuit further comprises a controller being a digital signal processor (DSP) and coupled to the first and the second inductors.

22. A method according to claim 15, wherein the circuit is a flyback converter having a transformer and an output stage, the synchronous rectifier is coupled between the transformer and the output stage, and the step (a) further comprises a step of (a1) providing the Vcomp having a value of a constant to the second terminal of the second inductor.

23. A method according to claim 15, wherein the circuit is a flyback converter having a transformer and an output stage, the synchronous rectifier is coupled between the transformer and the output stage, and the step (a) further comprises a step of (a1) providing the Vcomp having a value of a constant to the first terminal of the first inductor.

24. A compensation method for a circuit having a synchronous rectifier, and a first and a second inductors, wherein the synchronous rectifier has a first terminal and a second terminal, the first inductor has a first terminal and a second terminal coupled to the first terminal of the synchronous rectifier, and the second inductor has a first terminal coupled to the second terminal of the synchronous rectifier and a second terminal, and the method comprises the steps of:

(a) providing a threshold voltage value (VTH), a compensation voltage value (Vcomp) and a sensed voltage value (VDS) measured across the first terminal of the first inductor and the second terminal of the second inductor and reflecting a voltage across the first and the second terminals of the synchronous rectifier; and (b) reducing an influence of the first and the second inductors towards the sensed voltage value by the Vcomp.

25. A method according to claim 24 further comprising a step of comparing the VDS, the VTH and the Vcomp to turn on/off the synchronous rectifier at a specific moment accordingly.

* * * * *